(No Model.) 2 Sheets—Sheet 1.
A. K. ALRICK.
SHOE.
No. 306,205. Patented Oct. 7, 1884.
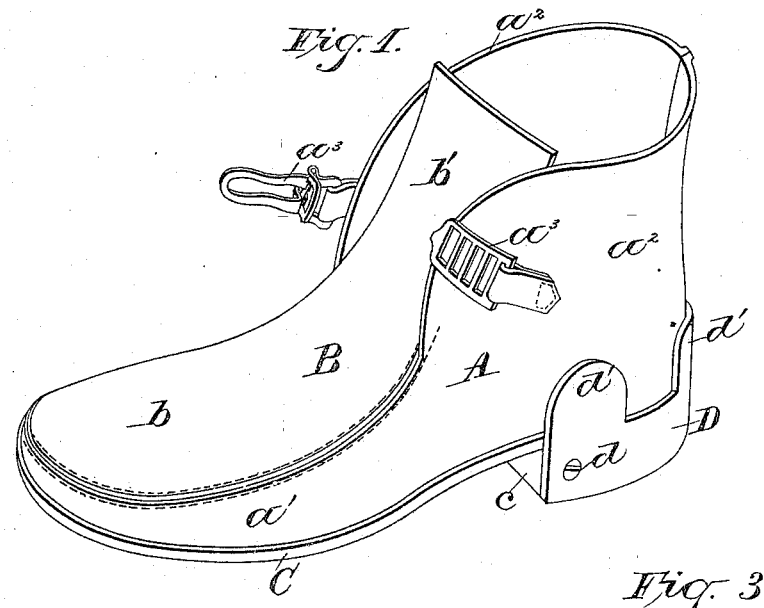
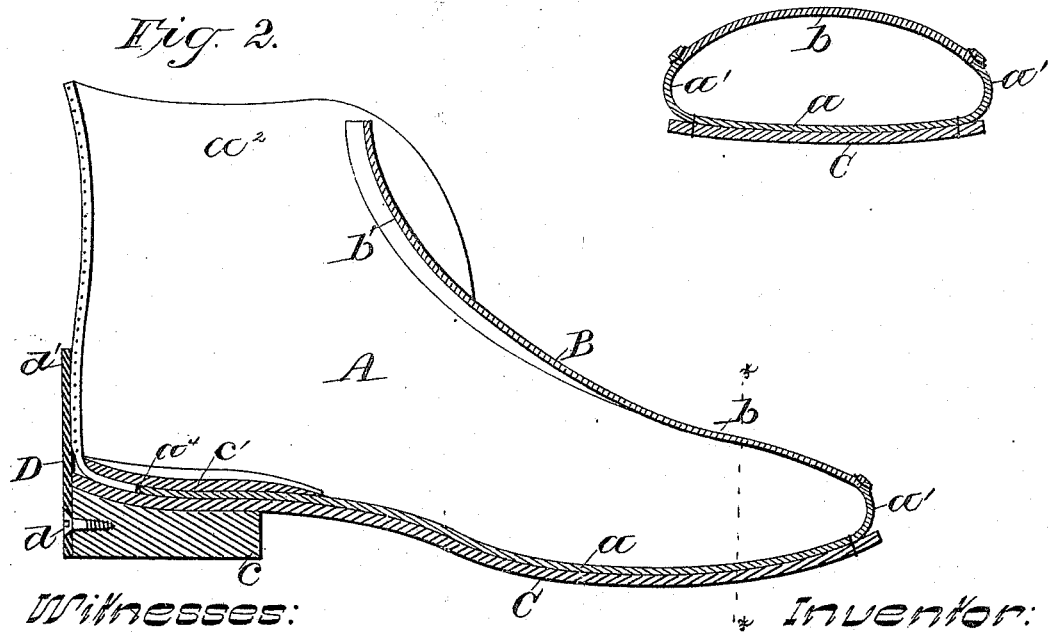
Witnesses:
E. G. Asmus
R. Platz
Inventor:
Andrew K. Alrick
By Stud & Underwood
Attorneys.

(No Model.)  2 Sheets—Sheet 1.
A. K. ALRICK.
SHOE.
No. 306,205. Patented Oct. 7, 1884.
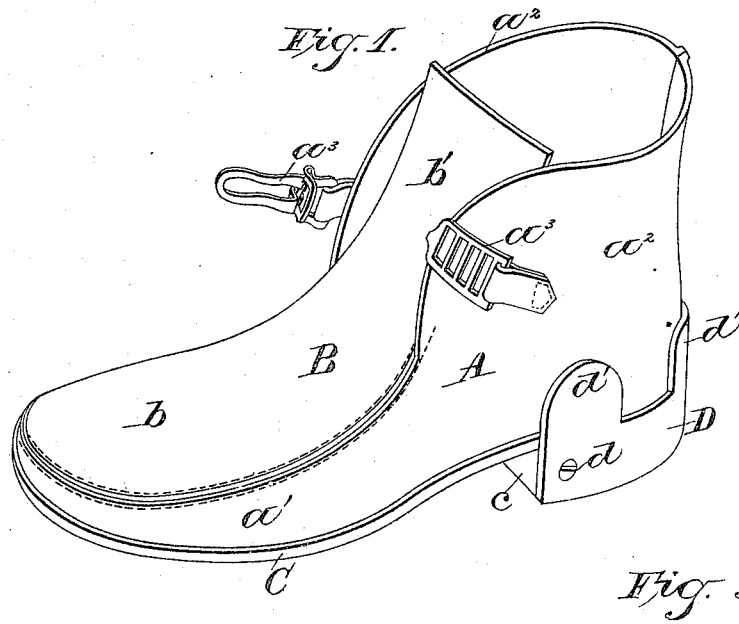
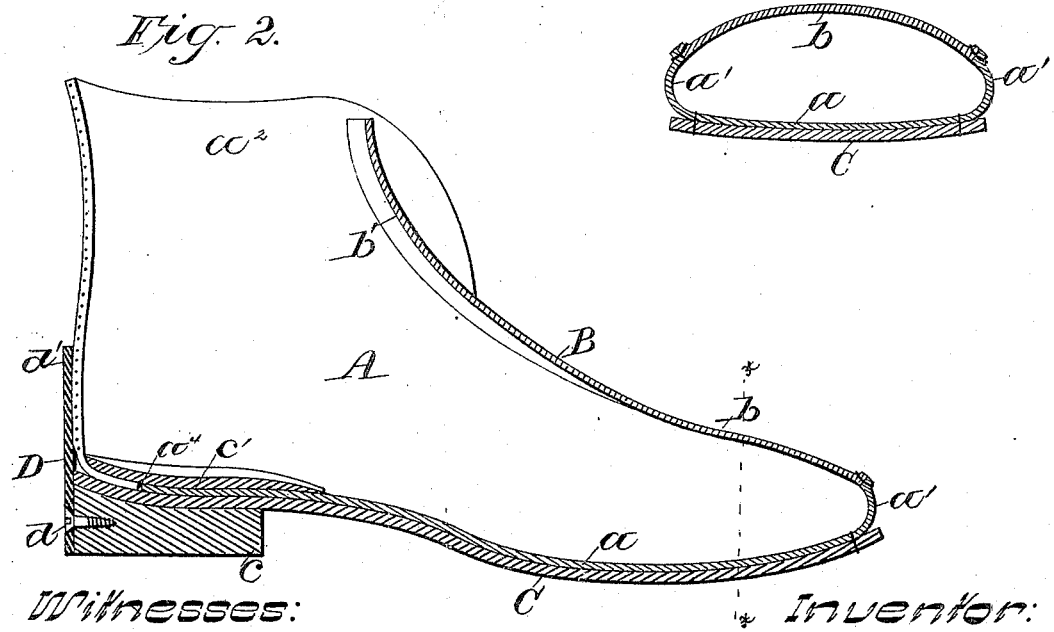
Witnesses:
E. G. Asmus
R. Platz
Inventor:
Andrew K. Alrick
By Stud & Underwood
Attorneys.

(No Model.)  A. K. ALRICK.  2 Sheets—Sheet 2.
SHOE.
No. 306,205. Patented Oct. 7, 1884.
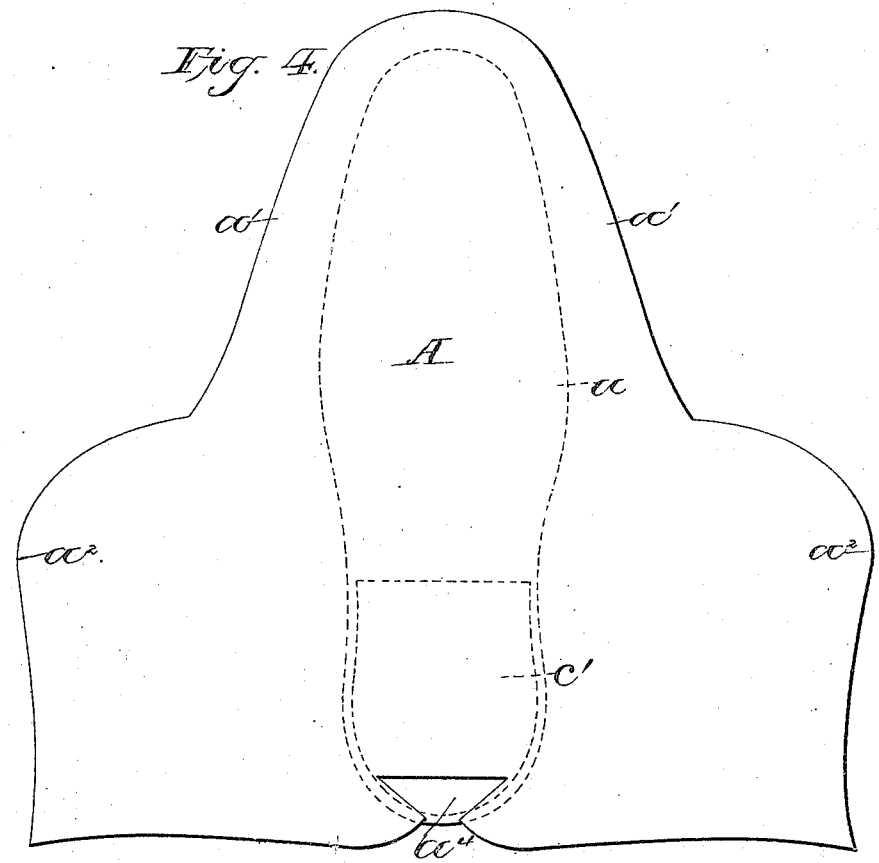
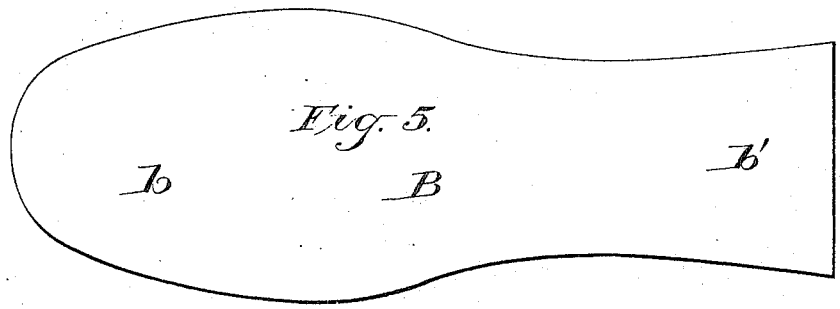
Witnesses:  Inventor:
E. G. Asmus  Andrew K. Alrick
R. Platz  By Stint & Underwood
  Attorneys.